ARTICLE STORAGE AND DISPENSING CART

Filed Jan. 31, 1962 4 Sheets-Sheet 1

INVENTORS:
GERARD A. NAAB
MARION F. SMITH
BY H. Walter [signature]
AGENT

Sept. 29, 1964 G. A. NAAB ETAL 3,150,902

ARTICLE STORAGE AND DISPENSING CART

Filed Jan. 31, 1962 4 Sheets-Sheet 2

3,150,902

ARTICLE STORAGE AND DISPENSING CART

Gerard A. Naab, Morton, and Marion F. Smith, Glenolden, Del., assignors to Brewer Pharmacal Engineering corporation, Upper Darby, Pa., a corporation of Pennsylvania Filed Jan. 31, 1962, Ser. No. 170,191
6 Claims. (Cl. 312—217)

The invention hereinafter described and claimed has to do with mobile article storage and dispensing carts provided with a plurality of drawers, in combination with latching mechanism enabling all of the drawers to be latched or unlatched simultaneously. The invention is particularly useful as a drug storage and issuing cart for use in hospitals as described in the co-pending application in the names of Frederic T. C. Brewer, William A. White and Walter E. Colburn, Serial No. 162,630, filed December 12, 1961, and entitled "Inventory Control System and Apparatus" and assigned to the same assignee as the present invention.

In that case the cart of the present invention is described as an integral part of an overall "system" for the storage of drugs and control of their flow in a hospital from the time the drugs enter the hospital pharmacy until they are passed on to the patients in accordance with physician's prescriptions. Pharmacy prepackaged drugs are stored in electronically controlled drug stations at the nursing units. From the stations, the medication nurse obtains the prescribed drugs and at the same time automatically records all the pertinent information and charges relating to the transaction. The drug packages thus obtained are stored in the cart in individual patient drawers under lock and key until the medication round.

At medication time, the cart is rolled down the corridor to the patients' rooms where each patient receives his medication on an individual basis, i.e., one at a time and from his own drawer in the cart. This system substantially eliminates the medication errors prevalent under the old methed in which all medications are poured at one time and usually carried on a tray to the various rooms. Until passed to the patient, the medications are left exposed on the tray, often becoming mixed up resulting in the wrong drug being issued to a patient, not to mention the accumulations on them of dust and dirt from the air.

It is the important object of the present invention to provide an article storage and dispensing cart overcoming the difficulties of the old system of medication passing in hospitals. It is another important object of the present invention to provide a cart affording a new and improved means for the passing of medications on a controlled individual basis to patients in a hospital or similar environment.

It is also an objective of the invention to provide a combined cart structure and latch mechanism whereby a plurality of drawers in the cart may be locked or unlocked simultaneously.

Another object of the invention is to provide such a combination whereby drawers arranged in rows and columns may simultaneously be locked or unlocked when in their fully closed position, or whereby the drawers may individually be moved to a latched condition.

A further object is to provide such a latch mechanism which is operable either to draw the cart drawers from a nearly closed position to a fully latched condition, or to move them to a more open condition whereby their unlatched condition is obvious and they can then individually be moved to a latched condition.

Briefly described, the invention comprises a medication cart having a plurality of latching elements arranged at the rear of a plurality of drawers in the cart structure, preferably, but not necessarily, in rows and columns. A particular feature of the novel latch mechanism is its arrangement and construction enabling all of the drawers to be unlatched or latched simultaneously by simple rotation of a single handle itself being latchable against actuation, or enabling the drawers to be latched individually after the latch mechanism is set in its latching condition.

Other objects and features of the invention will become apparent from the following description of a preferred embodiment of the invention when taken with the various figures of the drawings, in which.

Now with reference to the form of invention shown in FIGS. 1 through 10 it is seen that the cart shell or casing 20 is provided with a top work surface 22 having a plurality of recesses 24 of various shapes and sizes which serve as receptacles for bulk drugs, instruments and other devices necessary for patient care.

Figure 1:
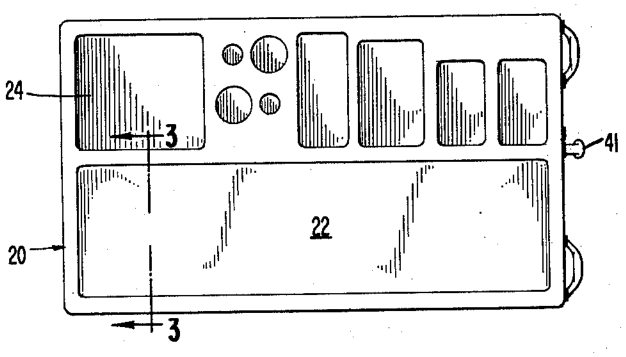
FIG. 1 is a top plan view of a cart in accordance with the invention.
Figure 2:
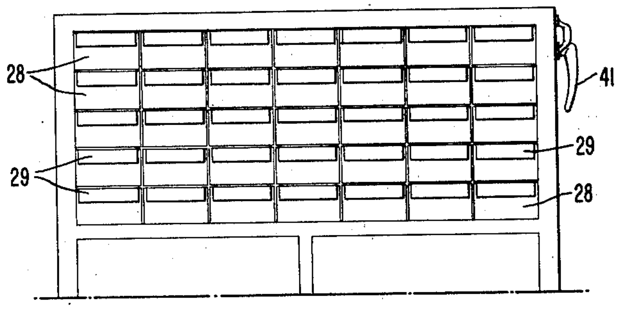
FIG. 2 is a fragmentary front elevational view of the cart of FIG. 1 showing its plurality of drawers arranged in columns and rows.
Figure 3:
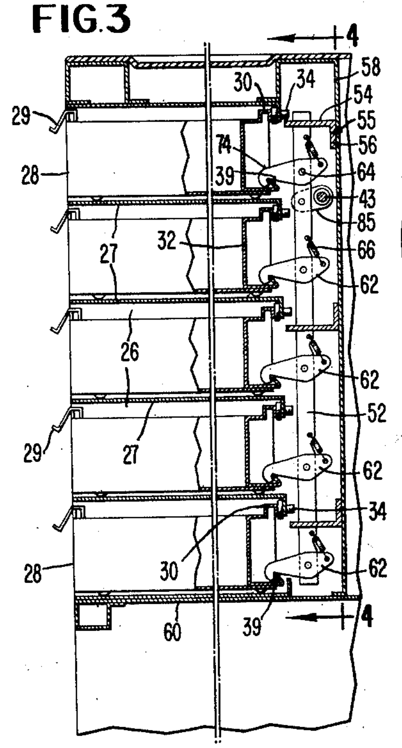
FIG. 3 is a sectional view taken along the line 3—3 of FIG. 1.
Figure 4:
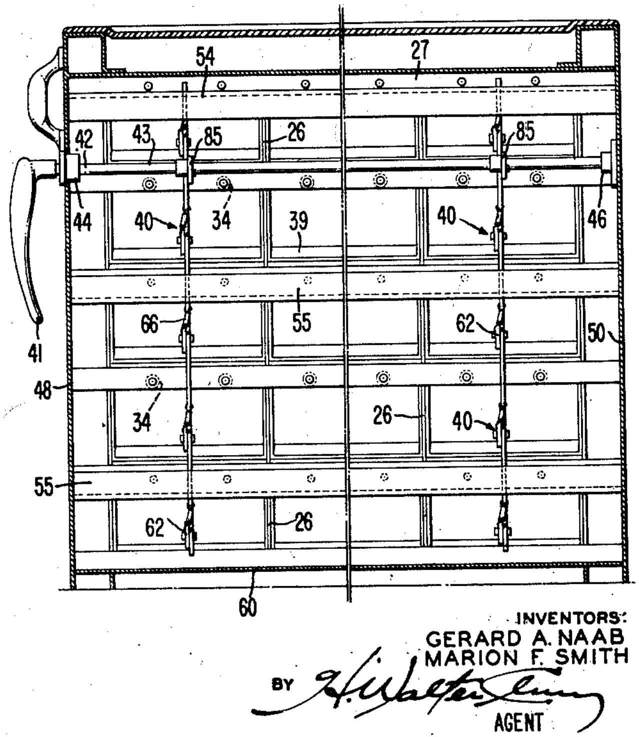
FIG. 4 is a sectional view taken along the line 4—4 of FIG. 3.

The cart is divided into a plurality of compartments by a network of vertically and horizontally integrated walls or partitions indicated in FIGS. 3 and 4 by the numerals 26 and 27 respectively. Each of the compartments is adapted to receive a drawer 28 each having a handle 29, which also may be used to attach indicia identifying the patient to whom the particular drawer is assigned. When the drawers are inserted in the compartments their front walls are in the same plane, and preferably flush with the front wall of the cart, which position is determined by contact of a projection 30 on the top of its back wall 32, with a rubber bumper 34 in a downturned flange portion 35 of the horizontal partition wall 27 above the drawer.

Figure 5:
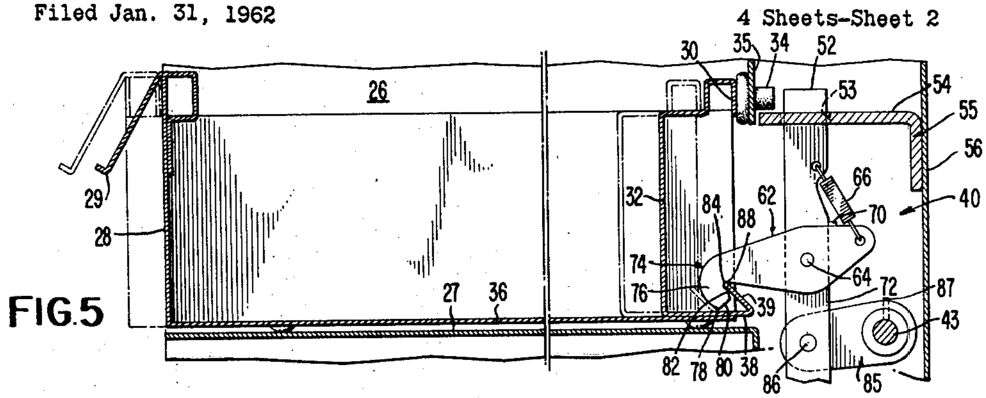
FIGS. 5 through 9 are operational views of a single latch element, which is typical of all in this embodiment.
Figure 6:
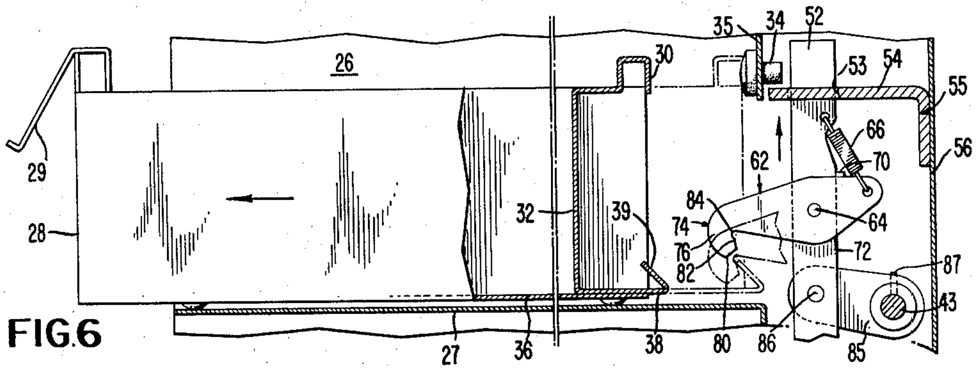

As seen more clearly in FIG. 5, the bottom wall 36 of each drawer includes a rearward extension 38, in this form of the invention provided by a rearwardly turned portion of the back wall 32. The terminal end of this extension 38 is turned angularly upward toward back wall 32 thus to form keeper means 39 by which the drawers may be latched in their closed positions, as described below.

Each column of drawers is provided with a multiple latch mechanism 40 (FIG. 4) individual to that column, but all operable simultaneously by the handle 41 in the manner described below. The handle is fastened to one end 42 of a horizontally positioned shaft 43 extending transversely across the cabinet preferably behind the top row of drawers (see FIG. 4), thus to position the handle near the top of the cart. The shaft is supported at its ends in bearings 44 and 46 secured to the cart side walls 48 and 50 respectively. Each of the latch mechanisms 40 comprises a vertically positioned bar 52 (FIG. 5) which passes through slots 53 in the horizontally arranged leg 54 of angle members 55 secured to a vertical wall member 58 extending from the top of the cabinet to a bottom wall 60 (FIG. 3).

Each bar 52 carries a plurality of latch members or bolts 62, each pivotally mounted thereon by a pin 64, and each being biased in a counter-clockwise direction by means comprising a coil spring 66 having one end connected to bar 52 and its other end to the right-hand end of the latch bolt (FIG. 5). A laterally extending portion 70 of the latch bolt abuts the rear edge 72 of the bar 52 thus to limit the counter-clockwise rotation of the latch element to the position shown in FIGS. 5 through 8. A leftward extension 74 of the latch member is formed roughly in the shape of a button hook, with the hook portion 76 turned downwardly and provided with a rounded outer surface 78 and a flat inner cam surface 80 extending angularly upward to the right to join another cam surface 82 also sloping upwardly but slightly to the left, and terminating in a detent 84. Each of the bars 52 is carried by and supported upon a link 85 having one end pivotally connected thereto by the pin 86, and its other end fixed to shaft 43 as by a set screw 87.

Now with reference to FIGS. 5 through 8 showing various operating conditions of one of the latch elements, it will be seen that the keeper 39 on each drawer is adapted to be engaged behind the button hook end 74 of a latch bolt 62 whereby all of the drawers may be latched in their retracted positions as shown in FIGS. 3 and 5. When it is desired to unlatch the drawers, the handle 41 is rotated in a clockwise direction turning shaft 43 in a similar direction, as seen in FIG. 5, causing links 85 to move clockwise, raising the bars 52 from the position shown in this figure to that shown in FIG. 6, wherein the latch bolts 62 are above keepers 39, thus unlatching the drawers for opening movement. It is understood, of course, that rotation of the handle simultaneously raises the latch element behind each of the drawers.

Figure 7:
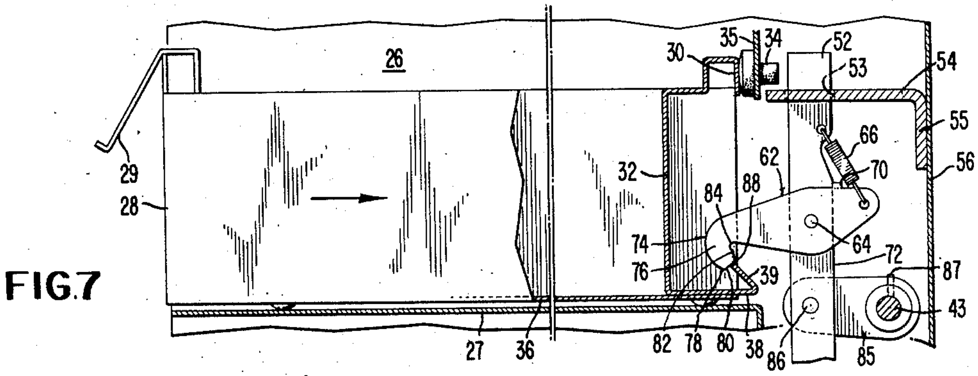
Figure 10:
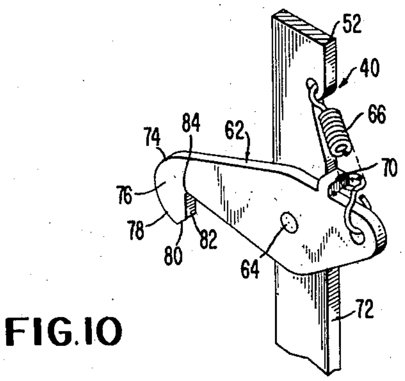
FIG. 10 is a fragmentary perspective view of one of the latch elements.

When the drawers are returned to their fully closed condition, as seen in FIG. 7, the latch handle 41 may be rotated in the opposite direction moving bars 52 downwardly whereby the hooked end portions 74 of the latch bolts move behind keepers 39 and again latch all of the drawers simultaneously. As each latch element moves downwardly its cam surface 80 contacts the upper edge 88 of keepers 39 camming the drawers inwardly against the tension of the rubber bumper 34 compressing the latter (see FIG. 5) and moving the keeper behind cam surface 82 which continues to move downwardly until the top edge 88 of the keeper moves into detent 84.

Figure 8:
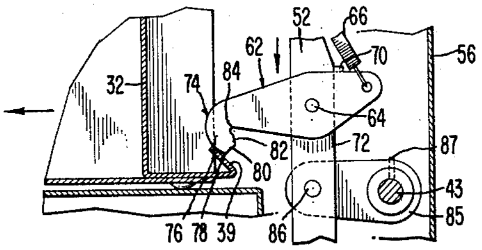
Figure 9:
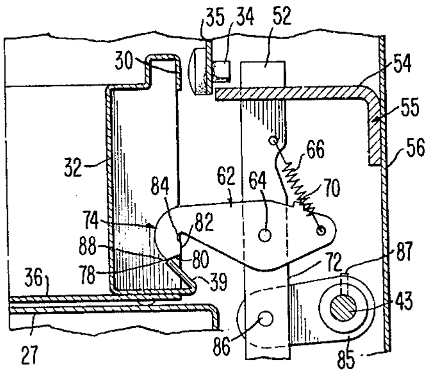

If any of the drawers, for one reason or another, is not fully closed when the handle is turned to latch them, the curved cam portion 78 will be brought into contact with the keeper, as seen in FIG. 8, forcing the drawer outwardly, thus signalling—by its very projection from the plane of the front face of the cart—that it is not locked. In this case, it is merely necessary to push the drawer inwardly whereby the keeper 39 will effect clockwise rotation of the associated latch bolt 62 about its pivot pin 64 until the button hook portion 74 thereof hooks over its top edge.

Figure 14:
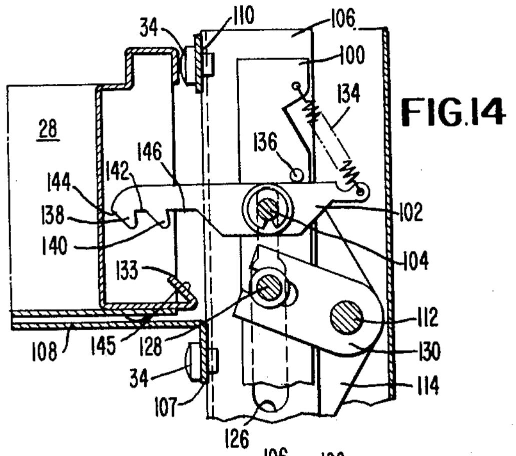
FIGS. 13, 14 and 15 are operational views of the modified latch mechanism taken substantially along the line 13—13 of FIG. 12.

In the modified form of the invention shown in FIGS. 11 through 19, the bar 100 upon which the latch bolts 102 are pivotally mounted as by pins 104, is carried by a vertically positioned angle bar 106 secured to the rear edges 107 of the horizontal partition walls 108 by welding, or other suitable means, as seen at 110 in FIG. 14. Also, as seen in this figure, the latch actuating shaft 112 is journalled in projecting ear portions 114 on the end angle bars 106A, 106B and an intermediate angle bar 106C, and extends across the cart at the rear of the top row of drawers. The handle 116 is secured to the end wall 118 of the cart (FIG. 18) as by the bearing block 120, with its inner end 124 operatively connected to the end of shaft 112 by a pin 125.

Figure 11:
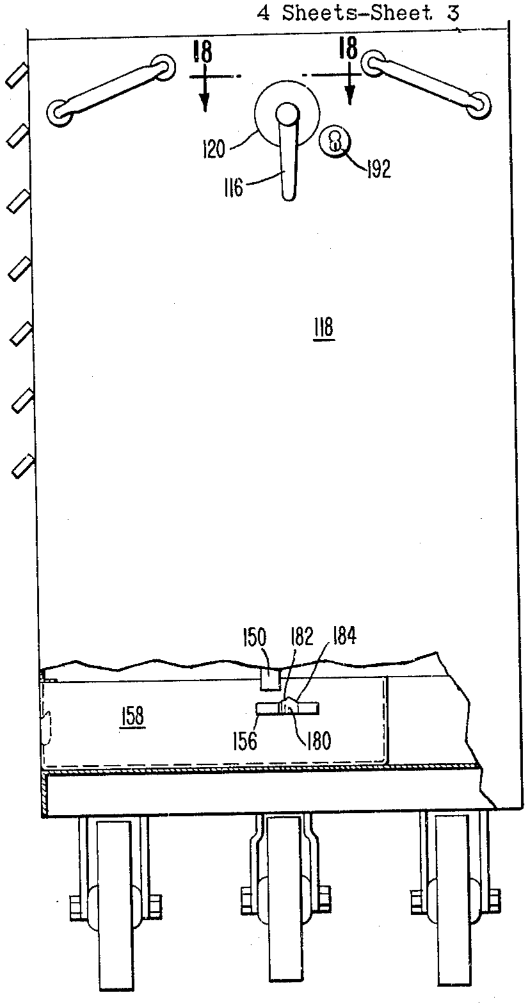
FIG. 11 is an end elevational view of the cart with parts broken away to show a portion of a modified form of latch mechanism.
Figure 12:
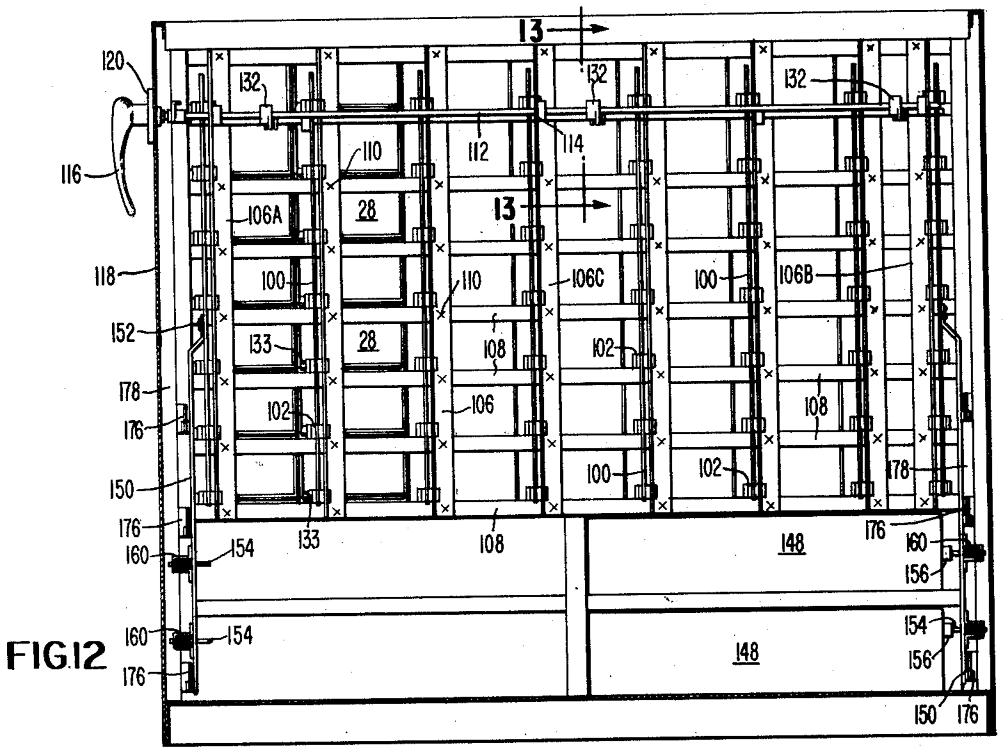
FIG. 12 is a sectional rear view of the cart showing only the first two columns of drawers.

Parallel with the shaft 112, and passing through a slot 126 (FIG. 14) in each angle bar 106, is a shaft 128 mounted for bodily vertical movement by links 130 fixed to shaft 112 at 132 (FIG. 12). Clockwise rotation of handle 116, as seen in FIGS. 11 and 14, will cause shaft 112 to turn links 130 to raise shaft 128 and simultaneously therewith each of the bars 100, thus to move the latch bolts 102 out of latching engagement with the keepers 133 on the trailing edge of each drawer 28. Each of the latch bolts 102 is urged in a counter-clockwise direction by a coil spring 134 to the illustrated horizontal position determined by a stop pin 136.

Figure 13:
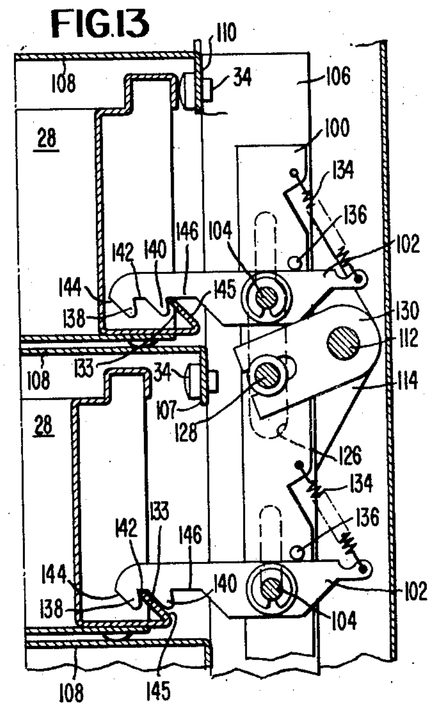

Each of the latch bolts in this form of the invention is provided with a pair of aligned latching hooks 138 and 140 whereby downward movement of the bar 100 to engage the bolts 102 with the keepers 133 will serve to latch the drawers even though they might not be fully closed as indicated at 142 in FIG. 13, wherein the drawer was moved toward its closed position but through inadvertence, not quite fully closed. In this case the latch hook 138 will engage the keeper and latch the drawer against opening movement. If for example a drawer was not closed sufficiently to catch behind either of the hooks and would be in the path of the cam surface 144 on the latch hook 138 the drawer would be cammed forwardly to an extent making it clearly evident to the operator that it had not been latched, upon which she may then push the drawer inwardly whereby the sloping surface 145 of the keeper would strike the cam surface of the bolt hooks and urge the bolt in a clockwise direction until the keeper became engaged behind the hook 140, as shown at 146 in FIG. 13.

Figure 15:
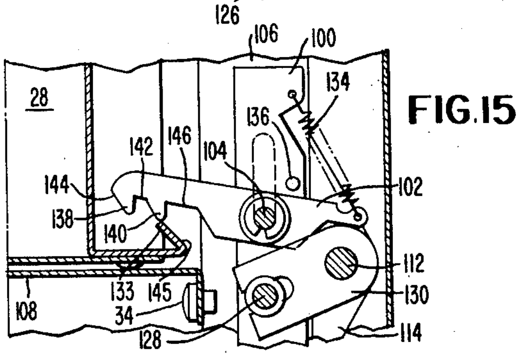

On rare occasions in connection with the use of the latch mechanism first described above, and as seen in FIG. 9, the button hook 76 may come to rest directly on the top edge 88 of the latch keeper 39, in which case the drawer would not be sufficiently open to clearly indicate its unlatched condition making it possible for some unauthorized person to open it. The latch mechanism as presently described with the two hooks (138 and 140) overcomes this problem. For example, if a drawer is pushed to its closed position, but only sufficiently for the bottom edge of the latch hook 140 to come to rest directly on the top edge of the latch keeper 133, as illustrated in FIG. 15, any attempt then to open the drawer would merely move it into position to immediately become engaged behind latch hook 138 (see 142 in FIG. 13) thus preventing illegal access to the drawer. The possibility of the drawer being left open sufficiently for this condition to arise with hook 138 is practically impossible because an unclosed condition of the drawer to this extent would be clearly obvious.

In either form of the invention, means may be provided simultaneously to latch large supply-carrying drawers 148 at the bottom of the cart, simultaneously with the operation of the latch mechanism associated with the upper drawers. This mechanism is illustrated in FIGS. 11, 12, 16 and 17 and comprises a drag-link 150 secured at 152 to bars 100 at opposite sides of the cart, one on the left side and one on the right side as seen in FIG. 12. During vertical movements of bars 100 the drag-links are similarly moved whereby latch bolts or pins 154 (FIG. 16) carried thereby are moved into and out of latching relationship with keepers 156 on the outer side walls 158 of the drawers.

Pins 154 are carried by link 150 by means of a C-shaped bracket or cage 160 (FIG. 16) having its ends, 162 turned outwardly and welded, or otherwise secured to link 150. Each pin extends through a hole in the end wall 164 of the bracket, and a hole in the link and is urged by a coil spring 166 to its extended position determined by engagement of flange 168 with the drag-link.

During normal operation of the apparatus, turning of handle 116 to unlatch the drawers moves bars 100, and consequently drag-links 150, upwardly thereby moving pins 154 upwardly from behind keeper 156 to the broken line position 170 (FIG. 16) thus to unlatch the drawers 148 simultaneously with the unlatching of drawers 28, as described heretofore. Latching of these drawers is by reverse rotation of the handle to return pins 154 to their positions behind the keepers. Movement of the drag-links is guided by engagement of pins 172 in slots 174 (FIG. 16) provided in angle members 176 secured to a fixed portion 178 of the cabinet.

Figure 17:
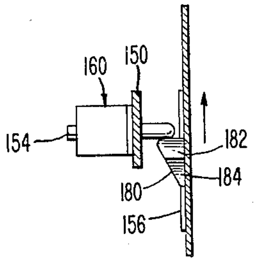
FIG. 17 is a fragmentary plan view of the mechanism shown in FIG. 16, and taken along the line 17—17 thereof.
Figure 16:
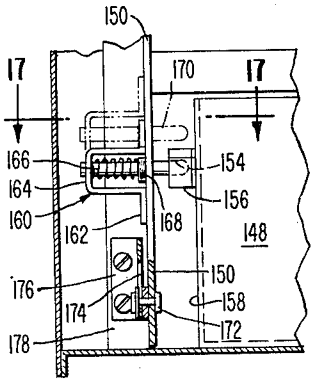
FIG. 16 is a fragmentary view of a latch extension in the modified form of the invention.

If a drawer 148 is open when the handle is rotated to latch the drawers it is only necessary for the drawer to be pushed to its fully closed position, the latch pin being retracted against the spring 166 by the cam surface 180 of the keeper (FIG. 17). The top surface of the keeper is provided with oppositely sloping cam surfaces 182 and 184 whereby if the drawer is not quite fully closed upon latching, pin 154 will engage one of the cam surfaces during its downward movement and cam the drawer either inwardly to its fully latched condition, or outwardly to a more obviously open condition.

Figure 18:
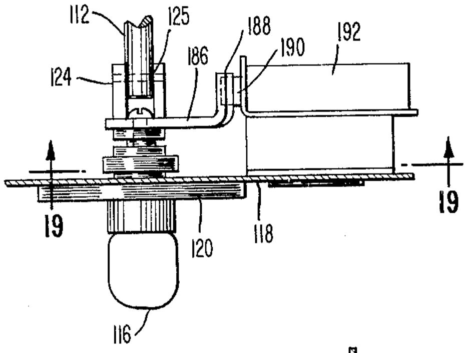
FIG. 18 is a fragmentary sectional view taken along line 18—18 of FIG. 11, and showing a lock mechanism for retaining the handle of the latch mechanism against operation.
Figure 19:
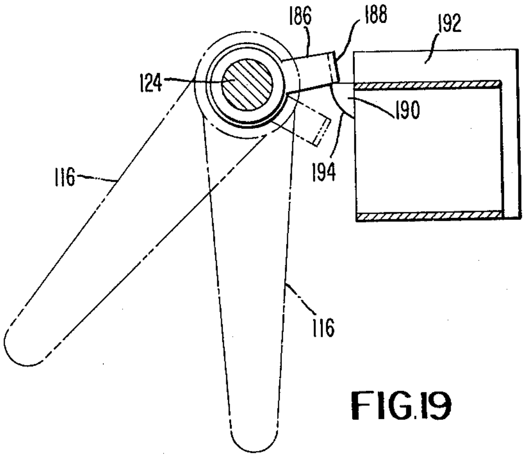
FIG. 19 is a fragmentary sectional view of the mechanism shown in FIG. 18, and taken along the line 19—19 thereon.

Now with reference to FIGS. 18 and 19 it is seen that the inner end 124 of the handle carries an angularly projecting link 186 having an end 188 turned in a direction parallel with the actuating shaft 112 and directly over a latch bolt 190 projecting from the key actuated lock 192 whereby, when the latch bolt is in its projecting position any attempt to rotate the handle to unlock the drawers will be stopped by contact of link 186 with the top surface of the latch bolt. An authorized operator of the cart will have a key in her possession to turn the lock and retract the latch bolt out of the path of movement of the link so that the handle can be turned. As seen in FIG. 19, the under surface 194 of the latch bolt 190 is curved in a manner permitting the handle to be rotated from its unlatched to its latched condition without first retracting the bolt with the key. The force of link 186 against the curved surface 194 cams the bolt to the right permitting the link to move above the bolt to its latched condition.

From the above it is now evident that the present invention provides a novel combined mobile cart and latch mechanism particularly adapted for use as a medication cart in hospitals and fulfilling the objectives set forth at the beginning of this specification.

What is claimed is:

1. A drug storage and dispensing cart for use in the passing of medications to hospital patients on an individual basis, comprising:

(a) a box-like housing;

(b) means forming a plurality of compartments arranged in rows and columns in a side face of said housing, a first portion of said compartments being in one part of the housing, and others being arranged in another part of the housing;

(c) an individual patient drawer slidably mounted for movement to and from a fully closed position in each of said compartments in said first portion, and in which an individual patient's drugs are stored;

(1) means on the front of each drawer providing for patient's identification;

(d) a latch keeper on each of said drawers;

(e) a plurality of latch bolts, one for each of said drawers arranged in rows and columns;

(f) means supporting the said plurality of latch bolts in rows and columns;

(g) handle means on an exterior wall of said housing and rotatable to actuate said latch bolts whereby said bolts are simultaneously actuated into or out of latching position for engagement or disengagement respectively with said keepers when said drawers are fully within said compartments;

(h) latch means effective when latched to prevent said handle being rotated in one direction to actuate said latch bolts out of latching position, but permitting said handle to be rotated in the opposite direction to move said latch bolts from unlatching to latching position;

(i) means mounting a plurality of wheels at the bottom of said cart whereby it may be moved about during medication rounds in the hospital; and (j) a top work surface on said cart having (1) a clear portion on which a nurse can prepare the individual patient's medication just prior to passing it to him, thus substantially eliminating medication error by administering to only one patient at a time; and (2) another portion having recessed compartments for holding bulk bottles of drugs, instruments, refuse, or other items.

2. A cart for the storage and dispensing of articles comprising (a) a housing;

(b) partition means forming a plurality of compartments therein, a portion of said compartments being arranged in rows and columns at the upper portion of the housing, and others being arranged beneath those at the top portion in a lower portion of the cabinet;

(c) a drawer slidably mounted for movement to and from a fully closed position in each of said compartments;

(d) a latch keeper on the rear wall of each of said drawers;

(e) a plurality of latch bolts, one for each of said drawers arranged in rows and columns;

(f) means supporting the said plurality of latch bolts in each column;

(g) a horizontally positioned shaft attached to each latch bolt supporting means;

(h) handle means rotatably mounted on a side wall of said cart and connected to an end of said shaft for actuating said latch bolt in a vertical plane when said handle is rotated whereby said bolts may be simultaneously actuated into or out of latching engagement with said keepers when said drawers are within said compartments;

(i) a drag-link attached to said supporting means;

(j) a latch bolt on said drag link for each of the drawers in the lower portion of the cart; and (k) a keeper on a side wall of each of said lower drawers for engagement and disengagement with said drag-link latch bolts during vertical movements of said latch bolt supporting means.

3. A combination, according to claim 2, wherein:

(a) said plurality of latch bolts comprise pivotally mounted hooks; and (b) said lower latch bolts comprise spring pressed pins.

4. A combination, according to claim 3, and further including;

(a) latch means for locking said handle against rotation when said latch bolts are in latching position whereby unauthorized access to said drawers may be prevented, yet permitting rotation of handle to move said latch bolts from their unlatched position to their latching position.

5. A drug storage and dispensing cart for use in the passing of medications to hospital patients on an individual basis, comprising:

(*a*) a box-like housing;

(*b*) means forming a plurality of compartments arranged in rows and columns in a side face of said housing;

(*c*) an individual patient drawer slidably mounted for movement to and from a fully closed position in each of said compartments and in which an individual patient's drugs are stored;

(1) means on the front of each drawer providing for patient identification;

(*d*) a plurality of latch keepers arranged in rows and columns, one for each of said drawers;

(*e*) a plurality of latched bolts arranged in rows and columns for movement in a vertical plane, one bolt for each of said drawers;

(*f*) handle means on an exterior side wall of said housing to actuate said latch bolts whereby said bolts are simultaneously actuated into or out of latching position for engagement or disengagement with said keepers when said drawers are fully within said compartments;

(*g*) latch means for said handle;

(*h*) said handle latch means is effective when latched to prevent rotation of said handle to move said latch bolts to unlatched position, but permits rotation of the handle to move said latch bolts from unlatched to latched position;

(*i*) means mounting a plurality of wheels at the bottom of said cart whereby it may be moved about during medication rounds in the hospital; and (*j*) a top work surface on said cart having, (1) a clear portion on which a nurse can prepare the individual patient's medication just prior to passing it to him; and (2) another portion having recessed compartments for holding bulk bottles of drugs, instruments, refuse, or other articles.

6. A construction in accordance with claim 5 wherein:

(*a*) said compartments are constructed in a manner whereby the fronts of the drawers in said carts are in a common plane when fully within said compartments; and (*b*) each of said bolts has inner and outer aligned keeper engaging portions either of which may engage a keeper, one when the drawer is still slightly open and the other when fully closed with its front in said common plane, and at least one of which has a surface effective to urge the drawers to a more obviously open condition from said common plane.

References Cited in the file of this patent

UNITED STATES PATENTS

| | | |
|---|---|---|
| 858,982 | Heinitz | July 2, 1907 |
| 1,036,345 | Sampson | Aug. 20, 1912 |
| 1,073,274 | Millice | Sept. 16, 1913 |
| 1,315,709 | Coombs | Sept. 19, 1919 |
| 1,486,094 | Lehman | Mar. 4, 1924 |
| 1,909,848 | Rand | May 16, 1933 |
| 2,182,037 | Schmitz | Dec. 5, 1939 |
| 2,501,932 | Budai | Mar. 28, 1950 |
| 2,575,661 | Hickey | Nov. 20, 1951 |

FOREIGN PATENTS

| | | |
|---|---|---|
| 360,961 | Great Britain | Nov. 13, 1931 |